United States Patent Office 3,533,964
Patented Oct. 13, 1970

3,533,964
CATALYTIC SURFACES AND PROCESS FOR
PREPARING THE SAME
Eugene G. Rochow, Winchester, Mass., assignor to Proto-tech Company, a division of Bolt Beranek and Newman Inc., Cambridge, Mass., a corporation of Massachusetts
No Drawing. Filed Apr. 26, 1968, Ser. No. 724,603
Int. Cl. B01j 11/08
U.S. Cl. 252—477                                    1 Claim

ABSTRACT OF THE DISCLOSURE

This disclosure deals with catalytically-active wall surfaces for catalytic reactors and the like, and processes for the preparation of the same; said surfaces comprising porous nonmetallic sheets impregnated with a dispersion of finely divided catalytic particles and heat-treated to be substantially free of dispersion byproducts, with the said particles bonded to and exposed at the porous outer surfaces of said sheet.

---

The present invention relates to improvements in the preparation of catalytically active surfaces for catalytic combustion reactors and other catalytic chemical reaction apparatus and the like, being more particularly concerned with methods for providing economical and effective catalytic surfaces comprising a multitude of fine particles of catalytically active metal supported on and affixed to a heat resistant base material.

The feasibility of employing catalytic chemical reaction to remove oxidizable impurities or contaminants from a stream of air, or to synthesize useful and valuable chemical substances, has long been recognized and widely used. Formerly, such processes have required complicated and costly apparatus for bringing the reacting fluids, such as air and contaminating smoke or fumes, to a temperature required for interaction with the catalysts, or else excessive back-pressures have been generated, as when catalytic pebble beds were employed as the contacting medium. More recently, a novel structure for conducting catalyzed chemical reactions has been disclosed in United States Letters Patent No. 3,206,334, embodying a plurality of low pressure-drop, straight-through cell channels for fluid flow, bounded by wall surfaces containing catalytic material. A particularly useful form of such structure involves a long sheet, strip or ribbon of transversely-crimped or corrugated electrically resistive metal or alloy, wound conjointly with a long sheet, strip or ribbon of heat-resistant insulating asbestos porous paper of approximately the same width to define substantially a helical, spiral or circular assembly of straight-through, parallel open-ended cells of approximately triangular cross section, each having two walls of metal and one of asbestos paper. The metal walls themselves or the oxides which form upon them may have specific catalytic activity for certain chemical reactions, as when the metal is nickel or an alloy thereof, and the reaction to be catalyzed is the oxidation of carbon monoxide. The insulating asbestos may exert a catalytic activity in itself, as in the oxidation or conversion of hydrocarbons sensitive to such silicate catalysts. For maximum catalytic activity over the broadest spectrum of chemical reactions, however, it also is desirable to have present a noble metal of the platinum family, such as palladium or platinum itself, in a finely-divided or otherwise suitably active form upon the porous outer surfaces defined by the asbestos or similar walls. It is convenient to support this noble-metal catalyst upon the asbestos paper, which does not alloy with it, nor coat it over with oxide, nor interfere with its operation in any other way. The porous nature of the asbestos paper, furthermore, allows it to present an increased surface area to the stream of gas or fluid flowing over it, thereby increasing the opportunity for catalytic interaction.

One way of incorporating a noble metal, such as platinum, with the asbestos or similar walls of the catalytic reactor assembly, is to saturate the entire helical assembly of corrugated metal and asbestos paper with an aqueous solution of, for example, chloroplatinic acid, or of ammonium chloroplatinate, the concentration of said solution being such that when the asbestos paper is completely saturated, it shall bear an amount of platinum equal to the weight percentage of elementary platinum desired in the final operating catalytic structure. Then the wet assembly is dried, as by blowing air through or over it, or by drying in an oven at 60° to 100° C. After drying, the assembly is heated, by passage of electric current or by other means, to a temperature sufficiently high to decompose the compound of platinum to finely-divided metallic platinum. The assembly is then catalytically active toward reactions such as the oxidation of hydrogen, which is sensitive to catalysis by platinum. Similar saturation of the asbestos with a solution of a salt or other compound of palladium leads to the deposition of catalytically active palladium after the operations just described have been carried out.

Although many catalytic reactors have been prepared and treated by the method just described, and were found to be satisfactorily effective in removing from a stream of air the polluting smoke or aerosol derived from vegetable oil or animal fat during the processes of deep-fat frying or broiling, as well as effective in the oxidation of pure gases such as hydrogen, or carbon monoxide, or methane, the cost of the amount of the noble metal used in the assembly is a matter of economic concern. The high cost of platinum, and of palladium and the other noble metals of the platinum family, makes it desirable that the least possible weight percentage of noble metal be used in the final reactor assembly. The method for depositing noble metal which has just been described has at least three distinct disadvantages: (1) the aqueous solution deposits salt or compound of the heavy metal throughout the bulk of the asbestos paper, whereas only that metal which is accessible on the surface of the asbestos in the finished assembly can be effective catalytically; (2) the wetting and drying procedures are slow and messy; and (3) if not all of the dissolved salt or compound is decomposed to metal, or not all to metal in an active form, further economic loss results. An analytical study of the distribution of platinum in the asbestos of a reactor so treated has verified the point made under (1) above.

In accordance with the present invention, on the other hand, it has now been discovered that improved catalytic behavior of such noble-metal catalyst, coupled with lower cost due to smaller total amounts of noble metal used, can be obtained, in summary, by applying the noble metal in finely-divided metallic form to the asbestos sheet with the aid of a suspension of the particulate metal in a suitable vehicle later described. The metal, being in a suspended particulate form (that is, a powder of very finely-divided metal suspended in an oily or viscous medium), does not penetrate to the interior of the asbestos sheet, when applied, but instead is filtered out upon the surface of the asbestos by the natural filtering action or capillary attraction of the asbestos paper; and only the liquid vehicle penetrates into the paper. Hence, this procedure constitutes an improvement in the preparation of a catalytically active surface having the distinct advantages of (a), using less of the expensive noble metal, since it is deposited only on the surface area available to the fluid to be catalytically reacted and not within the inaccessible interior of the supporting asbestos or other porous non-metallic wall; (b), the metal is always present in a known and predictably effective form upon the supporting surface, rather than in an unknown and variable form resulting from poorly controlled or unpredictable decomposition reactions; and (c), no messy or time-consuming wetting or drying steps are required. A more economical and more reliable catalytic reactor assembly accordingly results.

It is thus an object of the invention to provide a new and improved catalytic wall surface and process for preparing the same that is not subject to the before-mentioned disadvantages.

Other and further objects are pointed out hereinafter and are more particularly delineated in the appended claim.

The suspension of particulate metal to be used in accordance with the present invention may incorporate particles of any metal which is catalytic for the desired reaction or reactions. The metal may be comminuted under the surface of a liquid, for example, as it may be prepared in particulate form by reducing a compound of the metal at a temperature below the fusion point, and the powder then ground in a liquid vehicle. It is preferred that the vehicle be somewhat viscous, in order that the particles of metal may better remain suspended while the mixture is being applied, rather than settling out rapidly. Suitable vehicles are the drying oils used in household paints, or a varnish made from such an oil, or the so-called essential oils such as lemon oil or lavendar, or a lacquer made by dissolving a natural or synthetic oily resin in a suitable solvent.

It will be obvious to those skilled in the art that the particulate metal which constitutes the effective catalyst in the ultimate form of the reactor assembly need not necessarily be present as such in the suspending vehicle. A compound of the metal which is insoluble in the vehicle may be ground in the liquid vehicle until sufficiently dispersed and subdivided, and then applied as a suspension, as before. The particles of said compound which are filtered out of suspension at the surface of the porous supporting asbestos or similar medium may then be reduced to metal by heating the support or the finished assembly above the decomposition temperature of said compound, also drawing off the oil and other byproducts impregnated within the asbestos; or, in suitable cases, just by heating the finished assembly to its normal operating temperature. The only requirement is that the catalytic metal or its compound be substantially insoluble in the dispersing and supporting medium, so that most of it will be left deposited upon, bonded to and exposed at the surface of the supporting porous wall.

The suspension or dispersion of catalytic (or potentially catalytic) material may be applied by brushing it on one or both sides of the asbestos sheet or other porous nonmetallic support, or it may be applied with a paint roller, or by means of a calendering machine. Furthermore, it may also be sprayed or padded on, or applied by passing the asbestos paper sheet through a body of the liquid suspension at such a rate as to leave deposited on the surface of the paper the desired percentage of active material. The invention is not thus limited to any particular method of application. Neither is it limited to any one catalytic metal, or to any one group or family of metals. The term "metal" as used herein, moreover, is intended to cover all metal compounds such as metal oxides, sulfides, silicates, or the like that may be deposited in suitable form for catalytic reaction.

Having thus described the invention in more general terms, it is in order to illustrate its embodiment in several preferred examples.

EXAMPLE 1

Five and six-tenth grams of palladium paste (containing 65% by weight of finely-divided palladium suspended in a mixture of petrolatum and pine oil) was added to 455 ml. of turpentine and dispersed thoroughly by stirring. The resulting dispersion was applied as uniformly as possible (with a paint brush) to both sides of four strips of asbestos paper tape, each piece being two inches wide and 70 inches long. The strips were hung up overnight to dry, and then were used in the fabrication of catalytic structures for the removal of oxidizable impurities from air. Prior to use as such a catalyst, the structures were heated to 400° C. for twenty minutes to drive off turpentine, pine oil, and petrolatum, and to burn out cellulose and any other combustible constituents of the asbestos tape. This procedure left catalytically active palladium firmly deposited on asbestos paper, at a surface loading of about 0.005 gram of Pd per square inch of asbestos.

EXAMPLE 2

Using the method of Example 1, 0.425 gram of 65% palladium paste was dispersed in 35 ml. of oil of turpentine and applied by brush to 200 square inches of thin asbestos paper, a loading of 0.00213 gram of Pd per square inch of asbestos paper. The paper was dried overnight, fabricated into catalytic structures and then heated to drive off residual turpentine and other vehicle, thereby leaving active palladium firmly held on the surface of the treated asbestos paper.

EXAMPLE 3

A paste consisting of finely-divided platinum suspended in thick petrolatum was mixed with 100 times its volume of turpentine, and the resulting uniform dispersion of platinum was sprayed on both sides of a long strip of asbestos paper. The paper moved through the spray at such a rate that 0.002 gram of platinum was deposited on each square inch of the paper. The paper afterward was warmed to hasten the evaporation of the turpentine, and then the dry paper was used for the construction of catalytic units.

EXAMPLE 4

Platinizing paint of the sort used for decorating china and glassware was diluted with turpentine and applied by brush to both surfaces of asbestos paper type in such a way as to leave the equivalent of about 0.002 gram of platinum per square inch of asbestos. The platinizing paint was then allowed to dry on the tape, after which the tape was used to fabricate catalytic structures. The newly-made structures then were heated to a temperature sufficient to decompose the paint and deposit catalytically-active platinum on the surface of the asbestos fibers.

What is claimed is:

1. A method of making a catalytic reactor assembly, which comprises preparing a dispersion of particulate material in a viscous olaginous vehicle, said material being selected from the group consisting of noble metals of the platinum group insoluble in said vehicle, applying said dispersion to an asbestos paper carrier, causing said vehicle to penetrate into the interior of said carrier, and said particulate material to filter from said vehicle onto the surface of said carrier, and thereafter heating said carrier to a temperature sufficient to drive off the vehicle, burn off combustible constituents of said asbestos paper carrier, and ensure that said particulate material is catalytically active.

References Cited

UNITED STATES PATENTS

| | | | |
|---|---|---|---|
| 2,123,732 | 7/1938 | Keitel | 252—460 |
| 2,444,896 | 7/1948 | Shreir | 252—460 X |
| 3,428,424 | 2/1969 | Keith | 252—477 X |
| 3,437,605 | 4/1969 | Keith | 252—477 X |

DANIEL E. WYMAN, Primary Examiner

C. F. DEES, Assistant Examiner

U.S. Cl. X.R.

252—460